United States Patent
Uchida et al.

(10) Patent No.: US 8,217,535 B2
(45) Date of Patent: Jul. 10, 2012

(54) WIRELESS POWER SUPPLY APPARATUS

(75) Inventors: Akiyoshi Uchida, Kawasaki (JP); Masakazu Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 12/730,459

(22) Filed: Mar. 24, 2010

(65) Prior Publication Data

US 2010/0244580 A1    Sep. 30, 2010

(30) Foreign Application Priority Data

Mar. 31, 2009  (JP) .................................. 2009-084855

(51) Int. Cl.
 *H01F 37/00* (2006.01)
(52) U.S. Cl. ....................................................... 307/104
(58) Field of Classification Search .................. 307/104; 320/108
See application file for complete search history.

(56) References Cited

U.S. PATENT DOCUMENTS

| | | | |
|---|---|---|---|
| 5,734,254 A * | 3/1998 | Stephens | 320/106 |
| 8,008,888 B2 * | 8/2011 | Oyobe et al. | 320/108 |
| 8,035,255 B2 * | 10/2011 | Kurs et al. | 307/104 |
| 2007/0222542 A1 | 9/2007 | Joannopoulos et al. | |
| 2008/0266748 A1 | 10/2008 | Lee | |
| 2008/0278264 A1 | 11/2008 | Karalis et al. | |
| 2009/0174263 A1 * | 7/2009 | Baarman et al. | 307/104 |

FOREIGN PATENT DOCUMENTS

| | | |
|---|---|---|
| JP | 2008-508842 | 3/2008 |
| JP | 2009-501510 | 1/2009 |
| WO | WO 2006/011769 A1 | 2/2006 |
| WO | WO 2007/008646 A2 | 1/2007 |

\* cited by examiner

*Primary Examiner* — Michael Rutland Wallis
(74) *Attorney, Agent, or Firm* — Greer, Burns & Crain, Ltd (57) ABSTRACT

A wireless power supply includes: a power transmitting coil resonant at a first resonant frequency that generates a magnetic field resonance, a power receiving coil resonant at the first resonant frequency, a power receiving unit that outputs energy received by the power receiving resonant coil; a distance detector that detects a distance between the power transmitting resonant coil and the power receiving resonant coil; a power transmitting frequency controller that changes the first resonant frequency to a second resonant frequency on the basis of the distance detected by the distance detector; and a power receiving frequency controller that changes the first resonant frequency of the power receiving resonant coil from the first resonant frequency to a second resonant frequency on the basis of the distance detected by the distance detector.

7 Claims, 9 Drawing Sheets

WIRELESS POWER SUPPLY APPARATUS

CROSS-REFERENCE TO RELATED APPLICATIONS

This application is based upon and claims the benefit of priority of the prior Japanese Patent Application No. 2009-84855, filed on Mar. 31, 2009, the entire contents of which are incorporated herein by reference.

FIELD

The present invention relates to a wireless power supply system that wirelessly supplies electric power by a so-called magnetic field resonance mode.

BACKGROUND

As a wireless power supply system, generally, a technique using electromagnetic induction and a technique using radio waves are known. On the other hand, in recent years, a technique using a magnetic field resonance mode has been proposed.

Japanese Laid-open Patent Publication No. 2009-501510 discusses the wireless power supply technique using the magnetic field resonance mode, for example, a resonator having a resonant frequency of fr1 is provided in a power transmitting apparatus, and a resonator having a resonant frequency of fr2 is provided in a power receiving apparatus. By synchronizing the resonant frequencies fr1 and fr2, and appropriately adjusting the size and arrangement of the resonators, a magnetic field coupling is generated in which energy may be transferred between the power transmitting apparatus and the power receiving apparatus by the magnetic field resonance mode, and power is wirelessly transmitted from the resonator of the power transmitting apparatus to the resonator of the power receiving apparatus. According to such a wireless power supply technique, power transmission efficiency (energy transfer efficiency) may be several tens of percent, so that the distance between the power transmitting apparatus and the power receiving apparatus may be relatively large, for example, several tens of centimeters or larger for a resonator having a size of several tens of centimeters.

SUMMARY

According to an aspect of the invention, a wireless power supply includes: a power transmitting coil resonant at a first resonant frequency that generates a magnetic field resonance, a power receiving coil resonant at the first resonant frequency, a power receiving unit that outputs energy received by the power receiving resonant coil; a distance detector that detects a distance between the power transmitting resonant coil and the power receiving resonant coil; a power transmitting frequency controller that changes the first resonant frequency to a second resonant frequency on the basis of the distance detected by the distance detector; and a power receiving frequency controller that changes the first resonant frequency of the power receiving resonant coil from the first resonant frequency to a second resonant frequency on the basis of the distance detected by the distance detector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a wireless power supply by the magnetic field resonance mode, power is transmitted by setting a resonant frequency of a power transmitting coil and a resonant frequency of a power receiving coil to the same value. In this way, by using a resonance phenomenon in a magnetic field, power may be efficiently transmitted in medium distance such as from several tens of centimeters to several meters for a resonator having a size of several tens of centimeters. To maintain the efficient power transmission in the medium distance such as from several tens of centimeters to several meters, the resonant state needs to be maintained.

Accordingly, it is an object of the present invention to provide a wireless power supply apparatus which may prevent the power transmission efficiency from a power transmitting apparatus to a power receiving apparatus from decreasing.

Means For Solving The Problems

The disclosed wireless power supply apparatus includes a power supply unit, a power transmitting resonant coil, a power receiving resonant coil, a power receiving unit, a distance detector, a power transmitting frequency controller, and a power receiving frequency controller. The power supply unit supplies power. The power transmitting resonant coil may resonate in a magnetic field with the power receiving resonant coil at a resonant frequency that generates a magnetic field resonance, and transmits the power supplied from the power supply unit as a magnetic field energy by using the magnetic field resonance. The power receiving resonant coil may resonate in a magnetic field with the power transmitting resonant coil at the resonant frequency, and receives the magnetic field energy transmitted from the power transmitting resonant coil by using the magnetic field resonance. The power receiving unit outputs the magnetic field energy received by the power receiving resonant coil as electric power. The distance detector detects a distance between the power transmitting resonant coil and the power receiving resonant coil. The power transmitting frequency controller is provided for the power transmitting resonant coil, and changes the resonant frequency of the power transmitting resonant coil to a value determined on the basis of the distance detected by the distance detector. The power receiving frequency controller is provided for the power receiving resonant coil, and changes the resonant frequency of the power receiving resonant coil to a value determined on the basis of the distance detected by the distance detector, which is the same value as the changed value of the resonant frequency of the power transmitting resonant coil.

Advantage of the Invention

According to the disclosed wireless power supply apparatus, even when the distance between the power transmitting resonant coil and the power receiving resonant coil changes, it is possible to maintain the resonant state by changing the resonant frequency of the power transmitting resonant coil and the resonant frequency of the power receiving resonant coil. Therefore, it is possible to prevent the power transmission efficiency from the power transmitting apparatus to the power receiving apparatus from decreasing.

DESCRIPTION OF THE PREFERRED EMBODIMENTS

The inventor studied how to maintain a high-efficiency power transmission in the wireless power supply by the magnetic field resonance mode when the distance between the power transmitting resonant coil and the power receiving resonant coil changes. In other words, the inventor studied how to maintain the resonant state in the wireless power supply by the magnetic field resonance mode.

Figure 5A:
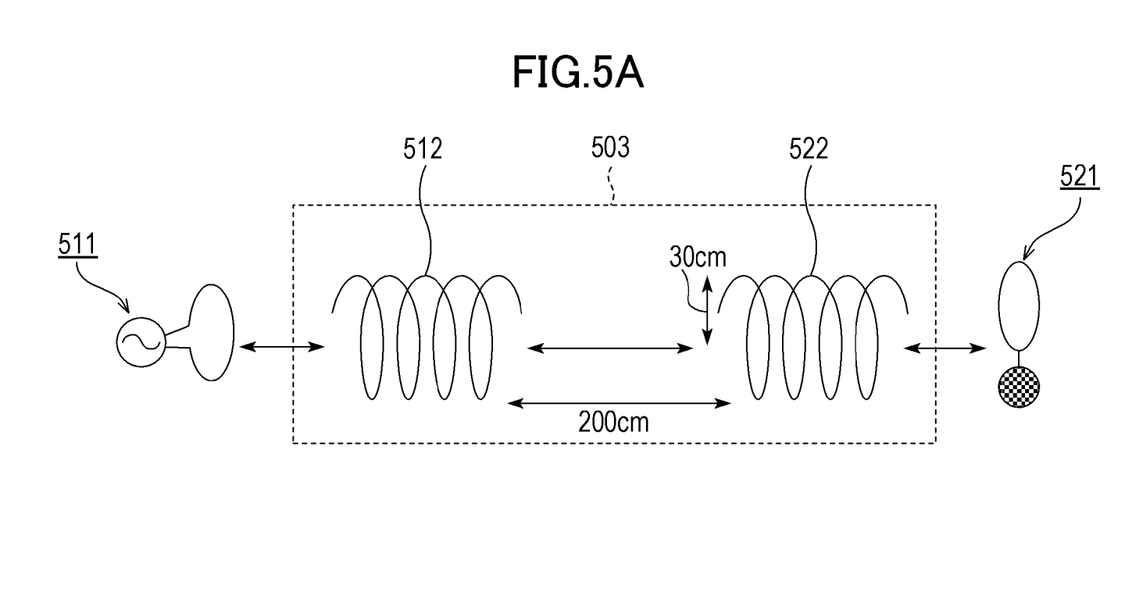
FIGS. 5A and 5B are illustrations of the wireless power supply by the magnetic field resonance mode.
Figure 5B:
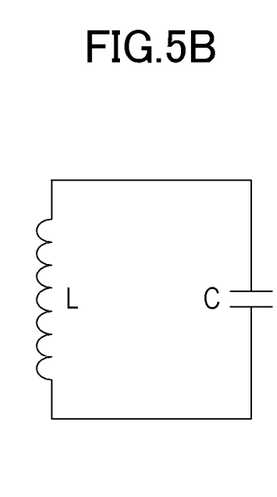

FIGS. 5A and 5B are illustrations of the wireless power supply by the magnetic field resonance mode.

As illustrated in FIG. 5A, in the wireless power supply by the magnetic field resonance mode, the resonant frequency of the power transmitting resonant coil 512 and the resonant frequency of the power receiving resonant coil 522 are set to the same value f. In this way, electric power is transmitted as magnetic field energy from the power transmitting resonant coil 512 to the power receiving resonant coil 522 by using the magnetic field resonance. The power supply unit 511 supplies electric power to the power transmitting resonant coil 512 by electromagnetic induction. The power receiving resonant coil 522 supplies electric power to the power receiving unit 521 by electromagnetic induction.

Here, the power transmitting resonant coil 512 is a coil having an inductance L and both ends of which are released, and has a floating capacitance C. In the examples in FIGS. 5A and 5B, although the floating capacitance C is assumed, an element capacitor C may be inserted. In this way, as illustrated in FIG. 5B, the power transmitting resonant coil 512 becomes an LC resonant circuit. The resonant frequency f of the power transmitting resonant coil 512 is obtained by $f=1/2\pi (LC)^{1/2}$ (Formula 1) on the basis of the inductance L and the capacitance C. This is the same for the power receiving resonant coil 522. Therefore, the product of L and C of the power transmitting resonant coil 512 and the product of L and C of the power receiving resonant coil 522 are required to be the same.

Figure 6:
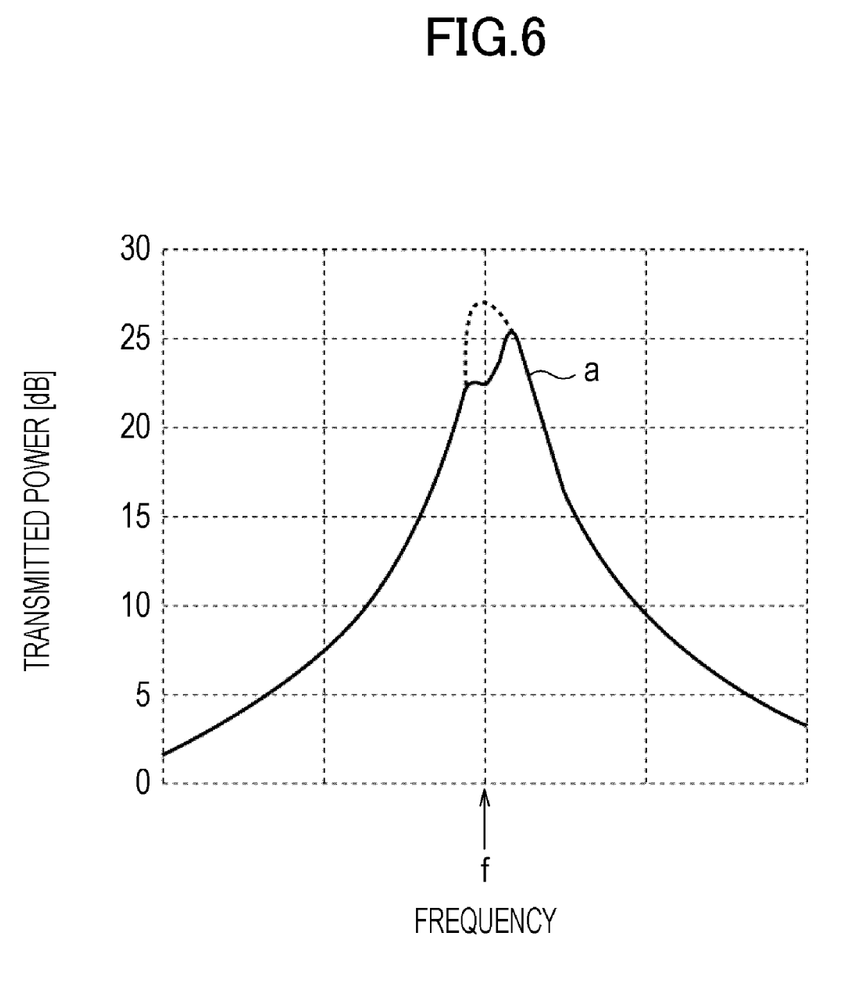
FIG. 6 is an illustration of the wireless power supply by the magnetic field resonance mode.
Figure 7:
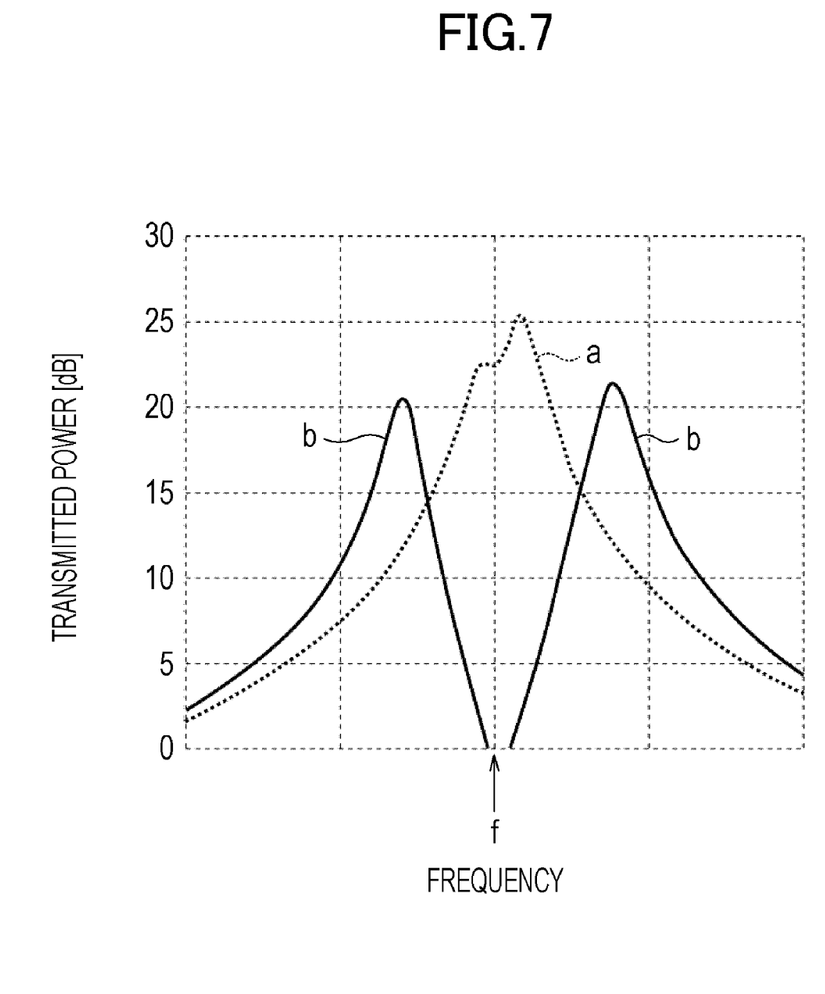
FIG. 7 is an illustration of the wireless power supply by the magnetic field resonance mode.
Figure 8:
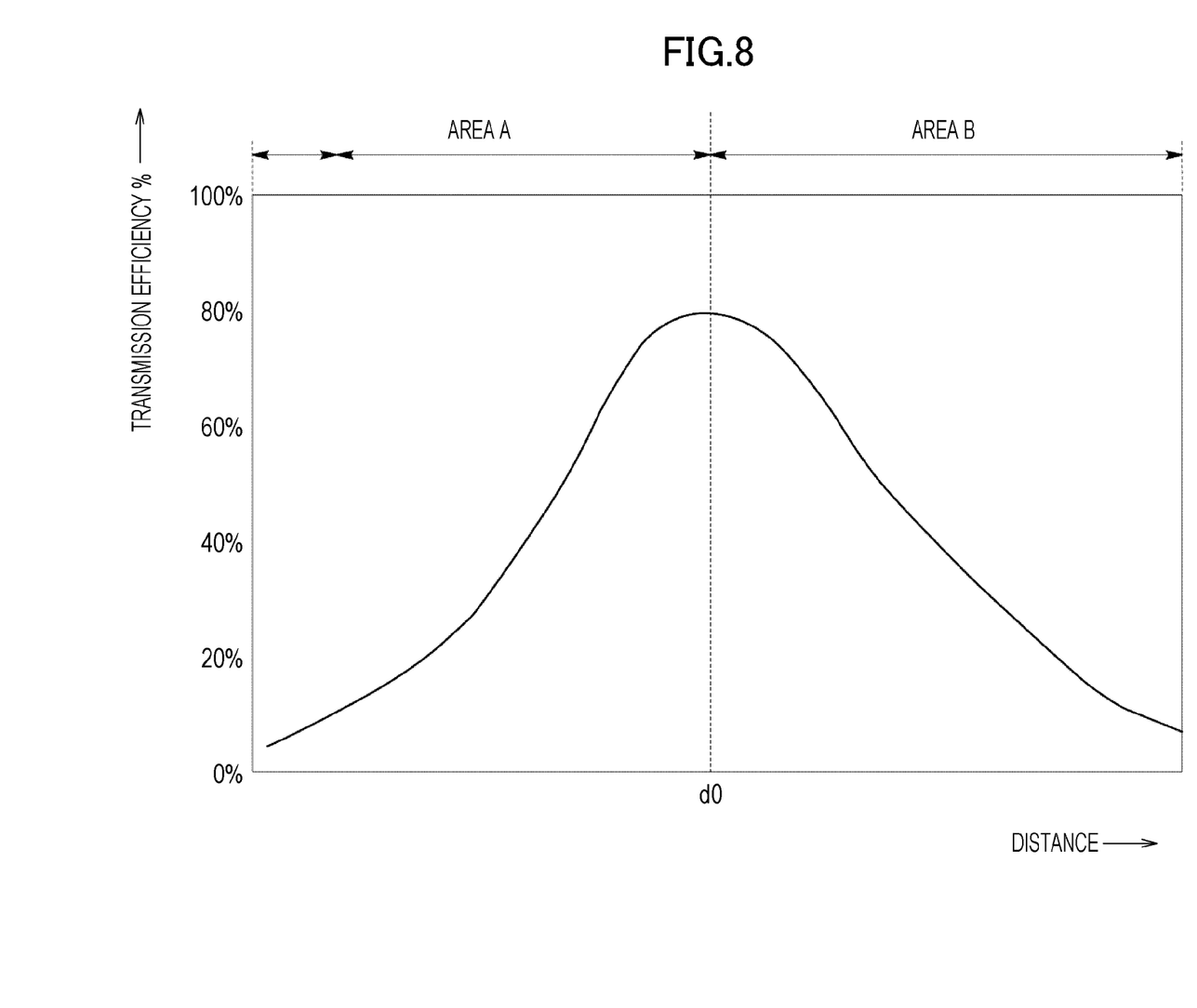
FIG. 8 is an illustration of the wireless power supply by the magnetic field resonance mode.

FIGS. 6 to 8 are results studied by the inventor, which illustrate transmitted power or transmission efficiency when the distance between the power transmitting resonant coil and the power receiving resonant coil changes in the wireless power supply by the magnetic field resonance mode.

FIG. 6 illustrates a relationship between the transmission frequency and the transmitted power when the distance between the power transmitting resonant coil and the power receiving resonant coil is optimal. In FIG. 6, the horizontal axis indicates the frequency, and the vertical axis indicates the transmitted power (dB). The transmission frequency is the resonant frequency of the power transmitting resonant coil and the resonant frequency of the power receiving resonant coil when the power is transmitted.

When the distance between the power transmitting resonant coil and the power receiving resonant coil is optimal, the transmitted power is illustrated by the curve "a" in FIG. 6. In other words, the transmitted power changes in accordance with the change of the transmission frequency f. When the transmission frequency is near the resonant frequency f, the transmitted power becomes maximum, and the power is transmitted at the highest efficiency.

In FIG. 6, the shape around the apex of the curve "a" is somewhat deformed. This depends upon various conditions other than the resonant frequency of the power transmitting resonant coil and the power receiving resonant coil. Therefore, in FIG. 6, when the transmission frequency is the resonant frequency f, the transmitted power is not the maximum. However, in an ideal case, the transmitted power may be assumed to become maximum when the transmission frequency is the resonant frequency f as illustrated by the dotted line.

FIG. 7 illustrates a relationship between the transmission frequency and the transmitted power when the distance between the power transmitting resonant coil and the power receiving resonant coil is shorter than the optimal distance. In FIG. 7, the horizontal axis indicates the frequency, and the vertical axis indicates the transmitted power (dB).

When the distance between the power transmitting resonant coil and the power receiving resonant coil is shorter than the optimal distance, the transmitted power is illustrated by the curve "b" in FIG. 7. In other words, the transmitted power illustrated by the curve "b" in FIG. 7 has two peaks, and becomes a so-called split state. At this time, the peak of the curve "a" in FIG. 6 corresponds to the center of the two peaks of the curve "b". Therefore, when the distance between the power transmitting resonant coil and the power receiving resonant coil is shorter than the optimal distance, if the transmission frequency is the resonant frequency f, the transmitted power decreases.

FIG. 8 illustrates a relationship between the distance between the power transmitting resonant coil and the power receiving resonant coil and the transmission efficiency. In FIG. 8, the horizontal axis indicates the distance between the power transmitting resonant coil and the power receiving resonant coil, and the vertical axis indicates the transmission efficiency (%). The transmission frequency is a constant value of the resonant frequency f, and the power supplied to the power transmitting resonant coil is a constant value of 100%.

As illustrated in FIG. 8, the transmission efficiency changes in accordance with the change of a coil distance which is the distance between the power transmitting resonant coil and the power receiving resonant coil. Specifically, the transmission efficiency becomes maximum when the coil distance is the optimal distance d0. In other words, the coil distance at which the transmission efficiency becomes maximum is the optimal distance d0 between the power transmitting resonant coil and the power receiving resonant coil at the resonant frequency f.

When the coil distance is shorter than the optimal distance d0, in other words, when the coil distance is in the area "a", the transmission efficiency decreases as the coil distance becomes shorter than the optimal distance d0. This corresponds to the case illustrated in FIG. 7. When the coil distance is longer than the optimal distance d0, in other words, when the coil distance is in the area "b", the transmission efficiency decreases as the coil distance becomes longer than the optimal distance d0. This corresponds to the case illustrated in FIG. 6.

As described above, according to the study of the inventor, in the wireless power supply by the magnetic field resonance mode, when the distance between the power transmitting resonant coil and the power receiving resonant coil changes, the transmission efficiency decreases or transmission becomes impossible. Therefore, in the present invention, when the coil distance changes, the resonant frequency of the power transmitting resonant coil and the resonant frequency of the power receiving resonant coil are changed when power is transmitted.

Figure 9A:
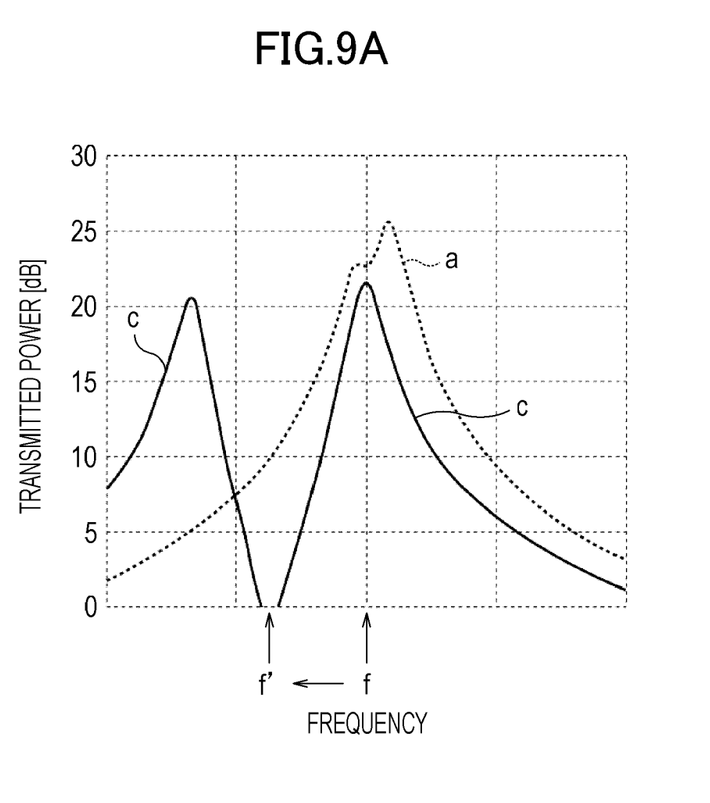
FIGS. 9A and 9B are illustrations of the wireless power supply by the magnetic field resonance mode.

For example, in the state illustrated in FIG. 7, the value of the resonant frequency is set to lower than the original resonant frequency f (set to a frequency f'). In this way, as illustrated in FIG. 9A, the curve "b" in FIG. 7 may be moved left as a whole to become the curve "c". In this way, one of the two peaks of the curve "c" may be matched with the peak of the curve "a".

Figure 9B:
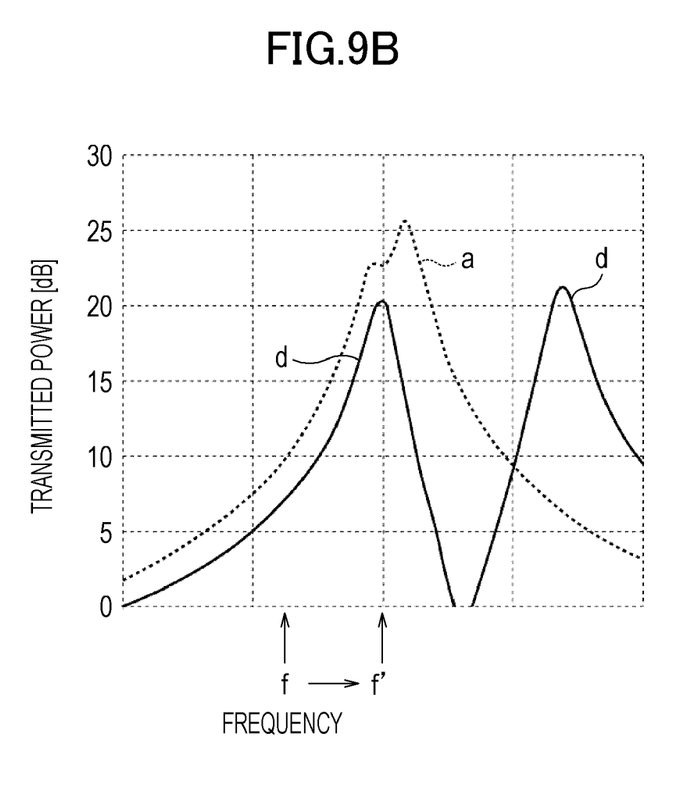

Or, in the state illustrated in FIG. 7, the value of the resonant frequency is set to higher than the original resonant frequency f (set to a frequency f'). In this way, as illustrated in FIG. 9B, the curve "b" in FIG. 7 may be moved right as a whole to become the curve "d". In this way, one of the two peaks of the curve "d" may be matched with the peak of the curve "a".

Such a change of the resonant frequency is equivalent to changing the coil distance to the optimal distance, by changing the resonant frequency in accordance with the change of coil distance that changed from the optimal distance d0 of the original resonant frequency f. As described above, the wireless power supply apparatus disclosed below maintains the resonant state by changing the resonant frequency of the power transmitting resonant coil and the resonant frequency of the power receiving resonant coil when power is transmitted.

Figure 1:
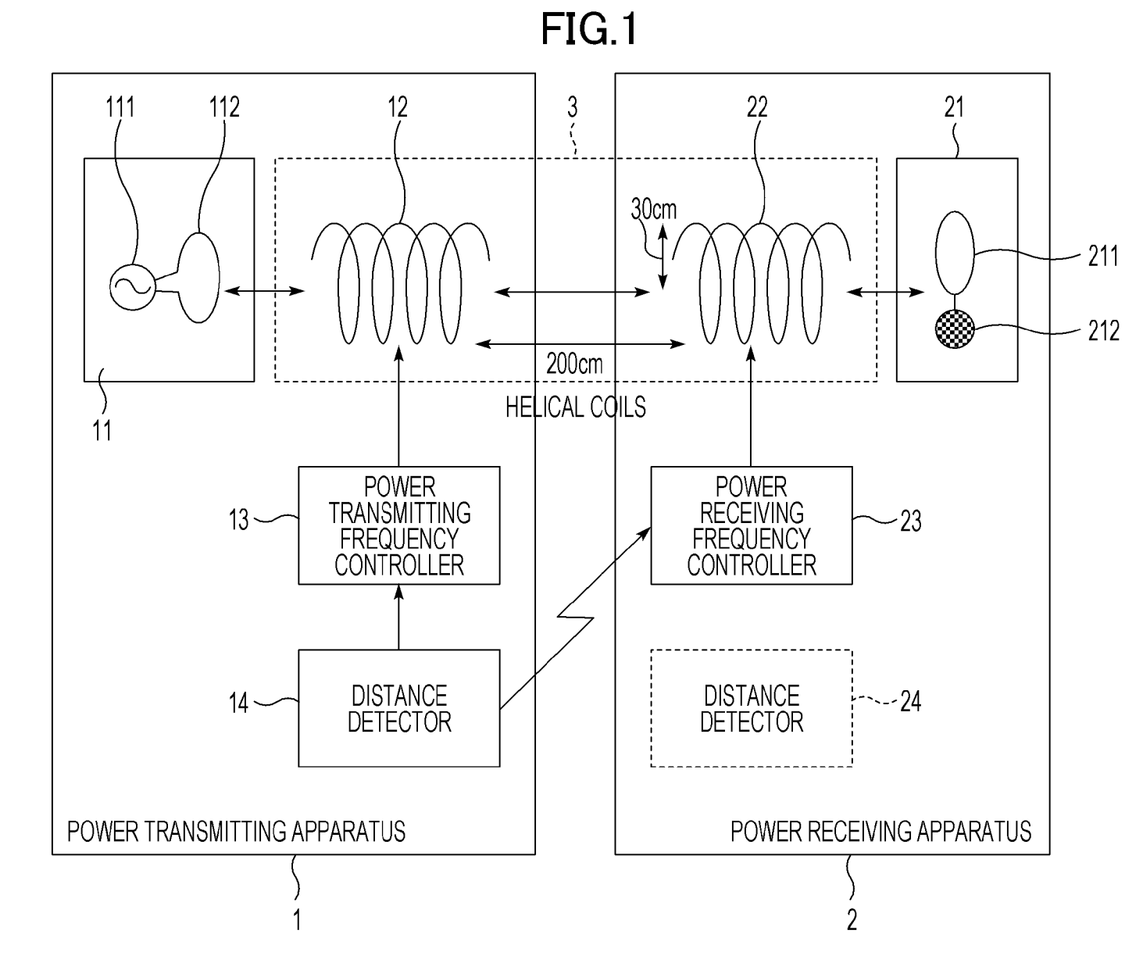
FIG. 1 is a diagram illustrating an example of a configuration of a wireless power supply apparatus.

FIG. 1 is a diagram illustrating an example of a configuration of the wireless power supply apparatus.

The wireless power supply apparatus includes a power transmitting apparatus 1 and a power receiving apparatus 2. The power transmitting apparatus 1 and the power receiving apparatus 2 are connected to each other by magnetic coupling 3. The power transmitting apparatus 1 includes a power supply unit 11, a power transmitting resonant coil 12, a power transmitting frequency controller 13, and a distance detector 14. The power supply unit 11 includes an oscillator circuit 111 and a power supply coil 112. The power receiving apparatus 2 includes a power receiving unit 21, a power receiving resonant coil 22, and a power receiving frequency controller 23. The power receiving unit 21 includes a power receiving coil 211 and a load 212.

The magnetic coupling 3 is realized by electromagnetic induction or magnetic field resonance between the power transmitting resonant coil 12 and the power receiving resonant coil 22. Whether the magnetic coupling 3 is realized by electromagnetic induction or magnetic field resonance depends upon the coil distance, which is the distance between the power transmitting resonant coil 12 and the power receiving resonant coil 22, as described below with reference to FIG. 3. Although the details will be described below, when the coil distance is short, electromagnetic induction is used, and when the coil distance is long, magnetic field resonance is used. By the magnetic coupling 3, the power transmitting apparatus 1 magnetically transmits electric energy to the power receiving apparatus 2.

The electromagnetic induction is established when the distance between the power transmitting resonant coil 12 and the power receiving resonant coil 22 is extremely short. On the other hand, the magnetic field resonance is established even when the coil distance is relatively long. In the magnetic field resonance, the resonant frequency of the power transmitting resonant coil 12 and the resonant frequency of the power receiving resonant coil 22 are required to be the same. Therefore, in the wireless power supply apparatus in FIG. 1, to realize the magnetic coupling 3 even when the coil distance is relatively long, the resonant frequency of the power transmitting resonant coil 12 and the resonant frequency of the power receiving resonant coil 22 are set to the same value f. The coil distance and the resonant frequencies will be described below respectively.

The power transmitting resonant coil 12 and the power receiving resonant coil 22 are required to have the same resonant frequency f, and for example, both coils can be a helical coil having a diameter of 30 cm formed of copper. The coil distance is, for example, 200 cm. The resonant frequency is, for example, 10 MHz. However, both coils are not necessarily required to have the same shape to have the same resonant frequency.

The power transmitting resonant coil 12 is a coil both ends of which are released. An electric circuit is not connected to the power transmitting resonant coil 12 in order to increase a Q value. The power transmitting resonant coil 12 becomes an LC resonant circuit as described below. The Q value which represents sharpness of the resonance is determined by a pure resistance and a radiation resistance of the coil, and the smaller the resistance values are, the larger the Q value may be obtained. The resonant frequency f is determined by the Formula 1 as described above, and is a value unique to the power transmitting resonant coil 12.

Different from FIG. 5, the power transmitting resonant coil 12 includes an air core coil unit and a capacitor serially connected to the coil unit. The power transmitting resonant coil 12 will be described below with reference to FIG. 2.

The power transmitting resonant coil 12 is in a resonant state with the frequency represented by the Formula 1 when the inductance of the coil unit is L, the capacitance of the capacitor is C, and a frequency of AC power supplied from the oscillator circuit 111 is f. This frequency f becomes the resonant frequency f. In the resonant state, energy is cyclically exchanged from an electric field formed by a voltage inside the capacitor to a free space magnetic field formed by a current flowing through the coil unit.

When the power transmitting resonant coil 12 which is in the resonant state is approached by the power receiving resonant coil 22 having the same resonant frequency, the power receiving resonant coil 22 resonates with the magnetic field from the power transmitting resonant coil 12. Such a resonant phenomenon caused by the magnetic field is referred to as magnetic field resonance mode. In the magnetic field resonance mode, the power of the power transmitting resonant coil 12 is wirelessly transmitted to the power receiving resonant coil 22 which approaches the power transmitting resonant coil 12. In other words, the magnetic field resonance mode is a resonant phenomenon of a resonant circuit via the magnetic field. In the power transmission using the magnetic field resonance mode, it is possible to transmit electric power with high efficiency even when the distance between the power transmitting resonant coil 12 and the power receiving resonant coil 22 is larger than the radius of these coils.

In the power transmitting apparatus 1, the power supply unit 11 supplies power to the power transmitting resonant coil 12. The oscillator circuit 111 of the power supply unit 11 includes a power supply that supplies power to the power supply coil 112. The oscillator circuit 111 is, for example, a Colpitts oscillator circuit. The power supply coil 112 is supplied power from the oscillator circuit 111 by using the resonant frequency f which causes magnetic field resonance between the power transmitting resonant coil 12 and the power receiving resonant coil 22, because of, for example, the reason described below.

The power supply coil 112 supplies the power supplied from the oscillator circuit 111 to the power transmitting resonant coil 12 by electromagnetic induction. Therefore, the power transmitting resonant coil 12 and the power supply coil 112 are arranged in a short distance range so that the power may be transmitted by the electromagnetic induction. In this way, the power is transmitted between the power supply unit 11 and the power transmitting resonant coil 12 by using electromagnetic induction.

Since electromagnetic induction is used instead of magnetic field resonance between the power transmitting resonant coil 12 and the power supply coil 112, the resonant frequency of the power supply coil 112 need not be considered as seen from the power transmitting resonant coil 12. Therefore, regarding the power supply coil 112, it is not necessary to consider that the resonant frequency of the power supply coil 112 changes depending on the oscillator circuit 111 connected to the power supply coil 112. Thus, by using the power supply coil 112, it is possible to increase design flexibility of the oscillator circuit 111. In addition, as described below, even when the resonant frequency of the power transmitting resonant coil 12 is changed, the oscillation frequency of the oscillator circuit 111 need not be changed. On the other hand, the oscillation frequency of the oscillator circuit 111 is arranged to oscillate at the resonant frequency f of the power transmitting resonant coil 12 considering compatibility with the power transmitting resonant coil 12. The oscillation frequency of the oscillator circuit 111 may be a frequency other than the resonant frequency f of the power transmitting resonant coil 12.

The power transmitting resonant coil 12 may magnetically resonate with the power receiving resonant coil 22 at the resonant frequency which causes the magnetic field resonance. The power transmitting resonant coil 12 transmits the power supplied from the power supply unit 11 to the power receiving resonant coil 22 as magnetic field energy by using magnetic field resonance, or transmits the power by using electromagnetic induction.

At this time, the distance detector 14 detects the coil distance which is the distance between the power transmitting resonant coil 12 and the power receiving resonant coil 22. In other words, the distance detector 14 includes a detector that detects a relative relationship between the power transmitting resonant coil 12 and the power receiving resonant coil 22. As described above, when the coil distance is short, electromagnetic induction is used. In magnetic field resonance, when the coil distance changes, the resonant frequency suitable to the transmission using the magnetic field resonance also changes.

Therefore, when power transmission between the power transmitting resonant coil 12 and the power receiving resonant coil 22 is started in accordance with, for example, turning on of a power transmission start switch, the distance detector 14 starts detection of the distance between these coils. The distance detector 14 successively transmits the detection result of the coil distance to the power transmitting frequency controller 13 by using, for example, a wired connection, and transmits the detection result to the power receiving frequency controller 23 by using, for example, a wireless communication such as Bluetooth or infrared communication.

Figure 4A:
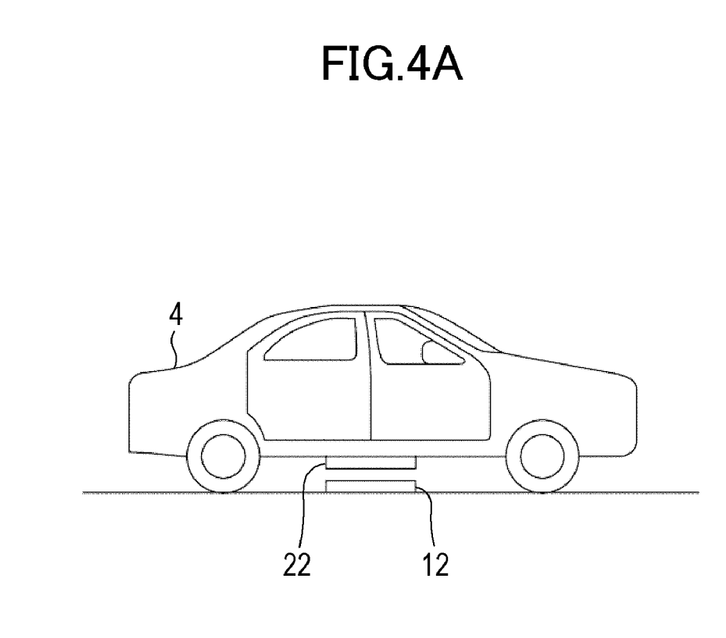
FIGS. 4A and 4B are diagrams illustrating an example of the wireless power supply apparatus.
Figure 4B:
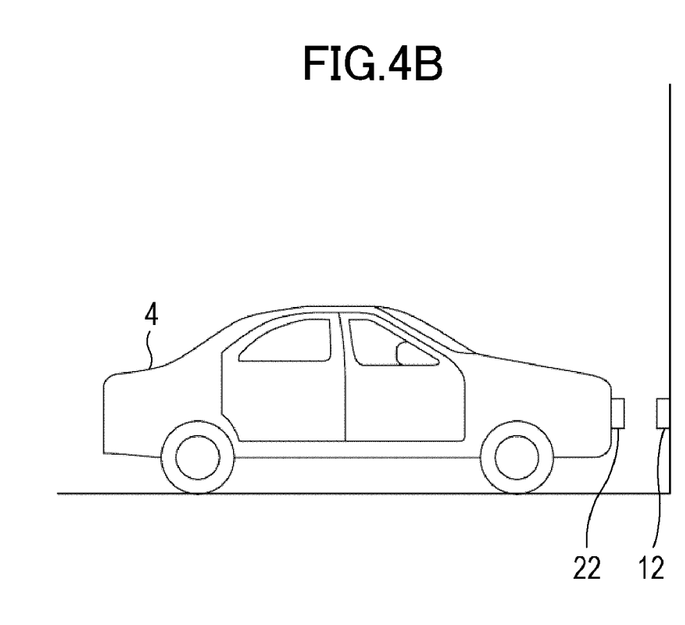

The coil distance may be detected by various means. For example, the distance between the power transmitting apparatus 1 and the power receiving apparatus 2 may be measured by using a commercially available distance detector, and the coil distance may be calculated on the basis of the measurement result. For more example, as described below with reference to FIG. 4, when the power receiving apparatus 2 is provided in a vehicle or the like, the distance between the power transmitting apparatus 1 and the power receiving apparatus 2 may be measured by an inter-vehicular distance measuring device mounted on the vehicle. Further, the coil distance may be detected by directly measuring the physical distance between the power transmitting resonant coil 12 and the power receiving resonant coil 22.

Instead of the distance detector 14, a distance detector 24 may be provided in the power receiving apparatus 2 as illustrated by dotted lines in FIG. 1. Both the distance detector 14 and the distance detector 24 may be provided in the power transmitting apparatus 1 and the power receiving apparatus 2.

The power transmitting frequency controller 13 is provided for the power transmitting resonant coil 12. The power transmitting frequency controller 13 receives the detection result of the coil distance from the distance detector 14, and changes the resonant frequency f of the power transmitting resonant coil 12 from the resonant frequency at that time (referred to as first resonant frequency) to a new resonant frequency (referred to as second resonant frequency) having a value different from that of the first resonant frequency, on the basis of the received detection result of the coil distance. In other words, the power transmitting frequency controller 13 changes power transmitting resonance characteristics of the power transmitting resonant coil 12, which is a power transmitting resonant circuit that may change the power transmitting resonance characteristics.

Therefore, the power transmitting frequency controller 13 includes a table in which, for example, capacitances for realizing a resonant frequency corresponding to several coil distances are stored for each coil distance. The power transmitting frequency controller 13 refers to the table by using the received detection result of the coil distance, selects a capacitance for realizing the resonant frequency corresponding to the coil distance, and forms a control signal for selecting the capacitance. Then, the power transmitting frequency controller 13 applies the control signal to the power transmitting resonant coil 12, and changes the first resonant frequency of the power transmitting resonant coil 12 to the second resonant frequency having a value corresponding to the detected coil distance. In this way, when the distance between the power transmitting resonant coil 12 and the power receiving resonant coil 22 is short, energy transmission using electromagnetic induction is possible, and in magnetic field resonance, it is possible to set a resonant frequency suitable to the transmission using the magnetic field resonance in accordance with the coil distance.

The power transmitting frequency controller 13 and the distance detector 14 are realized by a CPU and a program which is in a main memory and executes frequency control processing and distance detection processing. The power receiving frequency controller 23 is realized in the same way. The distance detector 14 further includes a measuring means for measuring distances of a set of positions in advance.

The values of the capacitances to be selected include "0" as described below. In this way, when the coil distance which is the distance between the power transmitting resonant coil 12 and the power receiving resonant coil 22 is short, energy transmission using electromagnetic induction is possible.

In the power receiving apparatus 2, the power receiving resonant coil 22 may magnetically resonate with the power transmitting resonant coil 12 at the resonant frequency. The power receiving resonant coil 22 receives magnetic field energy transmitted from the power transmitting resonant coil 12 by using magnetic field resonance, or receives energy transmitted from the power transmitting resonant coil 12 by using electromagnetic induction. As described above, the resonant frequency of the power receiving resonant coil 22 corresponds to the resonant frequency f of the power transmitting resonant coil 12.

The power receiving frequency controller 23 is provided for the power receiving resonant coil 22. The power receiving frequency controller 23 changes the resonant frequency f of the power receiving resonant coil 22 in the same way as the power transmitting frequency controller 13. Specifically, the power receiving frequency controller 23 receives the detection result of the coil distance from the distance detector 14, and changes the resonant frequency from the resonant frequency at that time (first resonant frequency) to a new resonant frequency (second resonant frequency) having a value different from that of the first resonant frequency, on the basis of the received detection result of the coil distance. In other words, the power receiving frequency controller 23 changes power receiving resonance characteristics of the power receiving resonant coil 22, which is a power receiving resonant circuit that may change the power receiving resonance characteristics.

The power receiving unit 21 outputs the energy received by the power receiving resonant coil 22 as electric power. The power receiving coil 211 of the power receiving unit 21 receives the electric power from the power receiving resonant coil 22 by the electromagnetic induction. Therefore, the power receiving resonant coil 22 and the power receiving coil 211 are arranged in a short distance range so that the power may be received by electromagnetic induction. In this way, the electric power is transmitted between the power receiving resonant coil 22 and the power receiving unit 21 by using electromagnetic induction.

Since electromagnetic induction is used instead of magnetic field resonance between the power receiving resonant coil 22 and the power receiving unit 21, the resonant frequency of the power receiving coil 211 need not be considered as seen from the power receiving resonant coil 22. Thus, by using the power receiving coil 211, it is possible to increase design flexibility of the power receiving unit 21. In addition, as described below, even when the resonant frequency of the power receiving resonant coil 22 is changed, the power receiving coil 211 need not be changed.

The power receiving coil 211 is connected to the load 212. The load 212 consumes the electric power received from the power receiving coil 211. The load 212 is, for example, an electronic device, a battery, an incandescent lamp, or the like. Actually, an output circuit for converting the received electric power into electric power to be consumed by the load 212 is connected between the power receiving coil 211 and the load 212. The output circuit is, for example, an AC-DC converter, a voltage conversion circuit, a transformer, a rectifier circuit, a charging circuit for monitoring an amount of charge, or the like.

Figure 2A:
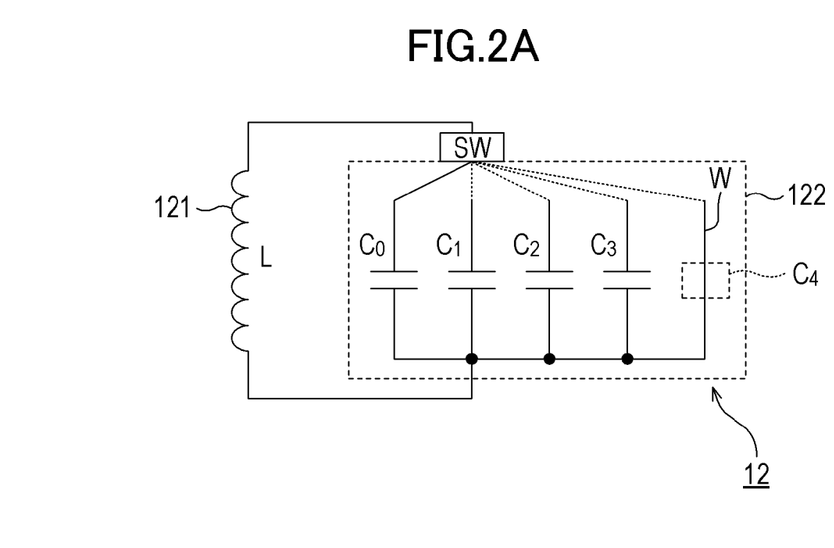
FIGS. 2A to 2C are illustrations of a transmission coil of the wireless power supply apparatus.
Figure 2B:
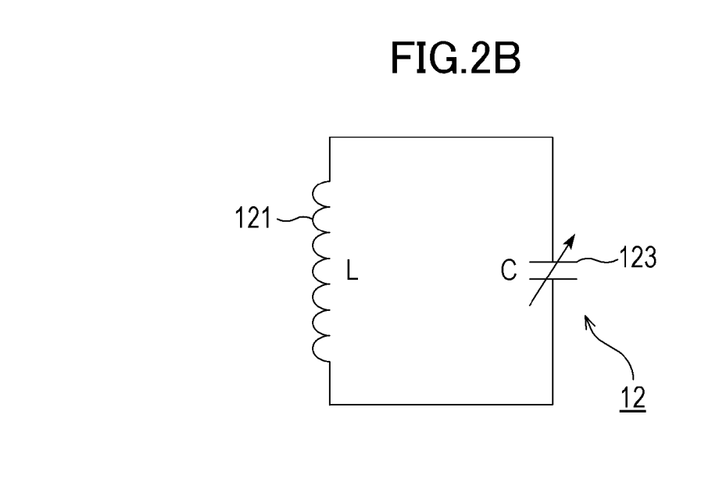
Figure 2C:
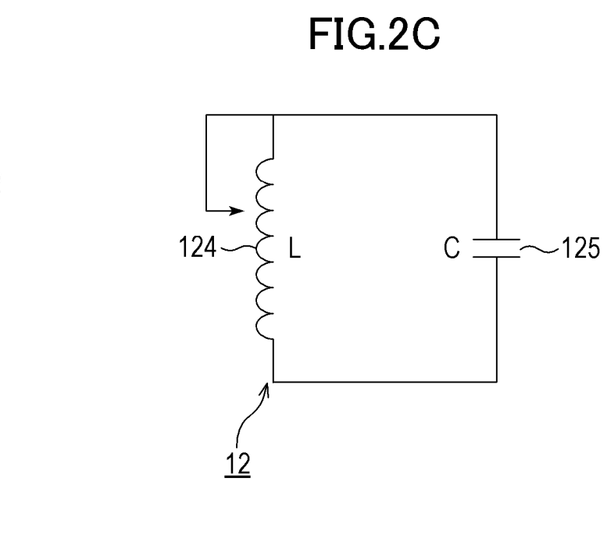

FIG. 2 is an illustration of the power transmitting resonant coil and the power receiving resonant coil of the wireless power supply apparatus in FIG. 1. Since the power transmitting resonant coil 12 and the power receiving resonant coil 22 have the same structure as described above, only the power transmitting resonant coil 12 will be described below, and the description of the power receiving resonant coil 22 will be omitted.

As illustrated in FIG. 2A, the power transmitting resonant coil 12 includes a coil unit 121 and a plurality of capacitors 122. The coil unit 121 has an inductance L. The plurality of capacitors 122 include four capacitors having different capacitances C0 to C3, a wiring W having no capacitance, and a switching switch SW. For example, the capacitor having the capacitance C0 is referred to as capacitor C0. The wiring W is referred to as capacitor C4 having no capacitance. Therefore, it is possible to say that the plurality of capacitors 122 include five capacitors having different capacitances C0 to C4. The plurality of capacitors 122 are connected in parallel. The switching switch SW switches the capacitances C0 to C4 of the capacitors 122.

The coil unit 121 is serially connected to the plurality of capacitors 122 via a switching switch in FIG. 2, and constitutes a closed circuit. Therefore, the power transmitting resonant coil 12 in FIG. 2A may change the resonant frequency f by fixing the inductance L and selectively switching the capacitance C.

As described above, the power transmitting frequency controller 13 selects one of the plurality of capacitors C0 to C4 of the capacitors 122. To do this, the power transmitting frequency controller 13 applies the control signal to the switching switch SW of the plurality of capacitors 122 of the power transmitting resonant coil 12. For example, the resonant frequency of the capacitor C0 is referred to as f0.

For example, the capacitor C0 has a maximum capacitance, and the capacitances of the capacitors C1 to C3 decrease in this order. The capacitor C4, which is the wiring W, has zero capacitance. When one of the capacitors C0 to C3 is selected, the power transmitting resonant coil 12 has a resonant frequency of a value corresponding to the selected capacitor. In this case, the resonant frequency has a value selected from a plurality of values set in advance on the basis of the distance between the power transmitting resonant coil 12 and the power receiving resonant coil 22.

When the capacitor C4, which is the wiring W, is selected, the power transmitting resonant coil 12 does not resonate and does not have the resonant frequency f because the capacitance of the capacitor C4 is zero. In this case, the power transmitting resonant coil 12 transmits power to the power receiving resonant coil 22 by using electromagnetic induction.

As illustrated in FIG. 2B, the power transmitting resonant coil 12 may have one variable capacitor 123 instead of the plurality of capacitors 122. In this case, the resonance frequency has a continuously variable value determined on the basis of the distance between the power transmitting resonant coil 12 and the power receiving resonant coil 22. The power transmitting frequency controller 13 selects a value of the variable capacitor 123 by using the control signal. For this purpose, the power transmitting frequency controller 13 applies the control signal to the variable capacitor 123 of the power transmitting resonant coil 12.

The variable capacitor 123 may have a capacitance of value 0. Because of this, the power transmitting resonant coil 12 may transmit power to the power receiving resonant coil 22 by using electromagnetic induction.

As illustrated in FIG. 2C, the power transmitting resonant coil 12 may have one variable inductance 124 and one capacitor 125. The variable inductance 124 and the capacitor 125 are connected in series, and constitute a closed circuit. Therefore, the power transmitting resonant coil 12 in FIG. 2C may change the resonant frequency f by changing the inductance L continuously and fixing the capacitance C of the capacitor. The power transmitting frequency controller 13 selects a value of the variable inductance 124 by using the control signal. For this purpose, the power transmitting frequency controller 13 applies the control signal to the variable inductance 124 of the power transmitting resonant coil 12.

In this case, a switch (not illustrated in FIG. 2C) short-circuiting both ends of the capacitor 125 is provided. When the power transmitting frequency controller 13 turns the switch on, the capacitance of the capacitor 125 becomes equivalent to 0. In this way, the power transmitting resonant coil 12 illustrated in FIG. 2 may transmit power to the power receiving resonant coil 22 by using electromagnetic induction.

Figure 3:
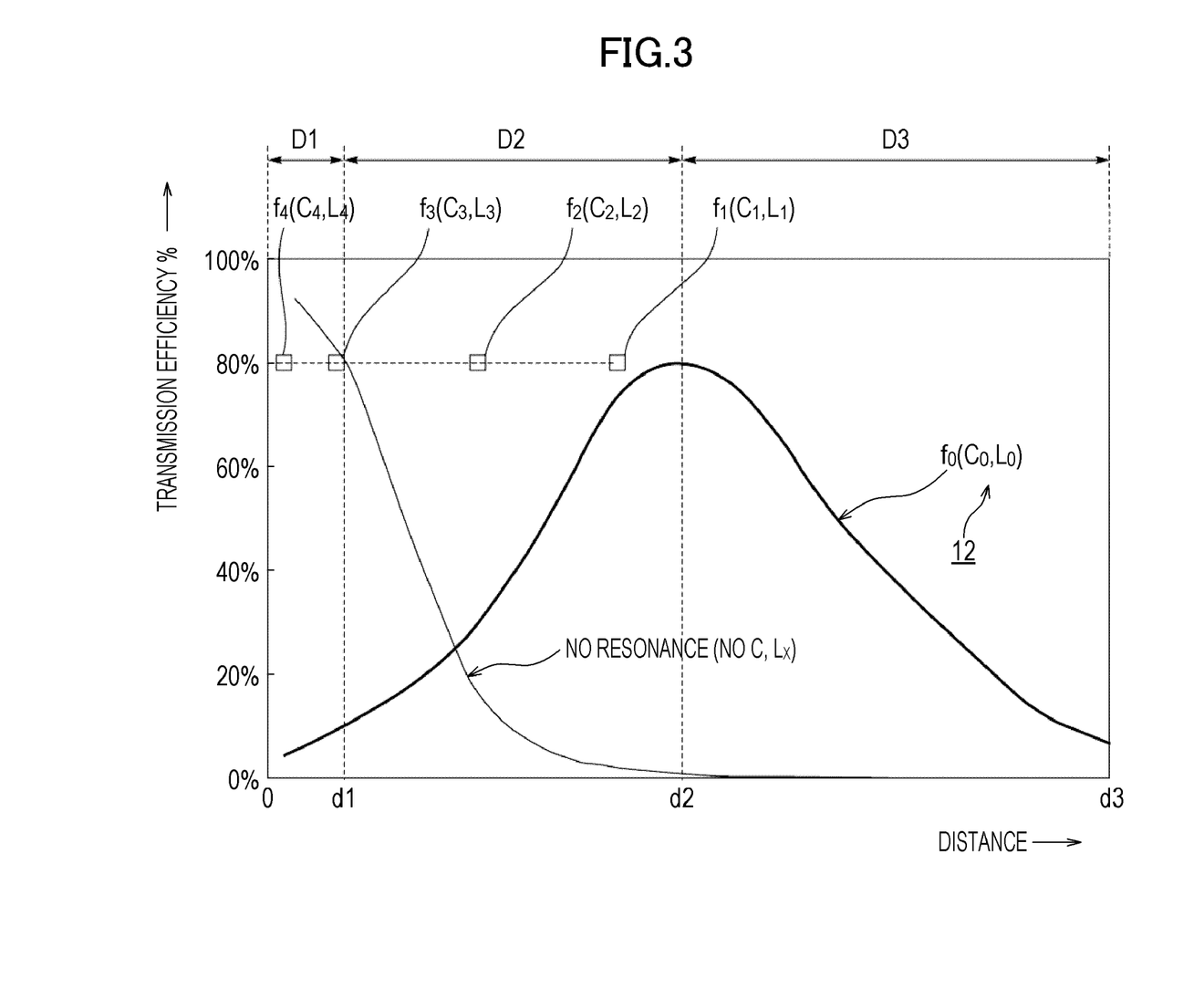
FIG. 3 is an illustration of wireless power supply by magnetic field resonance mode.

FIG. 3 is an illustration of the wireless power supply by the magnetic field resonance mode in the wireless power supply apparatus in FIG. 1. In FIG. 3, the horizontal axis indicates the distance between the power transmitting resonant coil and the power receiving resonant coil, and the vertical axis indicates the transmission efficiency (%). The power supplied to the power transmitting resonant coil is a constant value of 100%.

As described above, the wireless power supply apparatus in FIG. 1 realizes magnetic coupling 3 by electromagnetic induction or magnetic field resonance between the power transmitting resonant coil 12 and the power receiving resonant coil 22. The electromagnetic induction may be realized when the distance between the power transmitting resonant coil 12 and the power receiving resonant coil 22 is extremely short. Further, when transmitting electric power by using magnetic field resonance, the wireless power supply apparatus in FIG. 1 changes the resonance frequency of the power transmitting resonant coil 12 and the power receiving resonant coil 22 on the basis of the coil distance.

Therefore, in the wireless power supply apparatus in FIG. 1, the coil distance between the power transmitting resonant coil 12 and the power receiving resonant coil 12 is divided into three areas D1 to D3 as illustrated in FIG. 3.

The area D1 is an area in which the coil distance is smaller than d1. The area D1 does not include a case in which the coil distance is 0. The area D1 is an area in which the magnetic field is dominant. For example, d1 is several millimeters. As described above, the area D1 is an area where the power transmitting resonant coil 12 and the power receiving resonant coil 22 face each other within an extremely short distance, but are not in contact with each other.

Therefore, the area D1 is an area in which electric power may be transmitted by using electromagnetic induction between the power transmitting resonant coil 12 and the power receiving resonant coil 22. In the area D1, to increase the efficiency of the energy transmission using electromagnetic induction, the capacitance component in the power transmitting resonant coil 12 and the power receiving resonant coil 22 is separated. As a result, the power transmitting resonant coil 12 and the power receiving resonant coil 22 do not resonate with each other.

The area D2 is an area in which the coil distance is from d1 to d2. The area D1 is a near-field or an area in which the near-field is dominant. The distance d2 is a distance at which the maximum efficiency may be obtained in the energy transmission at the resonant frequency f of the power transmitting resonant coil 12 and the power receiving resonant coil 22. As described above, the resonant frequency f is determined by the inductance component and the capacitance component in the power transmitting resonant coil 12 and the power receiving resonant coil 22. Therefore, d2 is the optimal distance d0 of the resonant frequency f. For example, d2 is several hundreds of centimeters. As described above, the area D2 is an area in which the power transmitting resonant coil 12 and the power receiving resonant coil 22 are separated from each other by a middle distance.

Therefore, the area D2 is an area in which electric power may be transmitted by using magnetic field resonance between the power transmitting resonant coil 12 and the power receiving resonant coil 22, and also is an area in which the transmission efficiency increases as the coil distance increases when transmitting electric energy as magnetic field energy by using the magnetic field resonance. In the area D2, to increase the efficiency of the energy transmission using the magnetic field resonance, the resonant frequency f of the power transmitting resonant coil 12 and the power receiving resonant coil 22 is changed on the basis of the coil distance.

Practically, the area D1 and the area D2 cannot be clearly distinguished. As illustrated in FIG. 3, in an area near the distance d1, depending on the setting condition of the power transmitting resonant coil 12 and the power receiving resonant coil 22, both electromagnetic induction and magnetic field resonance may be established between the power transmitting resonant coil 12 and the power receiving resonant coil 22. Also, in the area near the distance d1, the efficiency of the energy transmission by the electromagnetic induction decreases sharply, on the other hand, the efficiency of the energy transmission by the magnetic field resonance increases sharply. Therefore, for example, as illustrated in FIG. 3, the distance from which the sharp decrease of the efficiency of the energy transmission by the electromagnetic induction starts is determined to be d1. The distance d1 may be determined empirically or experimentally.

The area D3 is an area in which the coil distance is from d2 to d3. In the same way as the area D2, the area D3 is the near-field or an area in which the near-field is dominant. In the area D3, when the coil distance is larger than d3, the transmission efficiency decreases sharply, so that it is almost impossible to transmit electric power as magnetic field energy by using magnetic field resonance. Therefore, the upper limit of the area D3 may be considered to be d3. The area in which the coil distance is larger than d3 is the area of electromagnetic wave propagation (electromagnetic field) or an area in which electromagnetic wave propagation is dominant. For example, d3 is about 10 m. As described above, the area D3 is an area in which the power transmitting resonant coil 12 and the power receiving resonant coil 22 are separated from each other by a middle distance.

Therefore, the area D3 is an area in which electric power may be transmitted by using magnetic field resonance between the power transmitting resonant coil 12 and the power receiving resonant coil 22, and also is an area in which the transmission efficiency decreases as the coil distance increases when transmitting electric energy as magnetic field energy by using magnetic field resonance. In other words, from the viewpoint of transmission efficiency, an effect of the change of the coil distance is larger than the resonant frequency of the power transmitting resonant coil 12 and the power receiving resonant coil 22. Therefore, in the area D3, the resonant frequency of the power transmitting resonant coil 12 and the power receiving resonant coil 22 is fixed to the value f0.

The area D2 and the area D3 may be clearly distinguished. Specifically, as illustrated in FIG. 3, as described above, the distance d2 is the optimal distance d0 of the resonant frequency f. Therefore, the distance d2 may be known in advance as the optimal distance d0 of the resonant frequency f when the power transmitting resonant coil 12 and the power receiving resonant coil 22 are designed.

When the coil distance is in the area D1, which is the magnetic field, the power transmitting frequency controller 13 sets the capacitance of the capacitors 122 of the power transmitting resonant coil 12 in FIG. 2A to 0. In other words, the power transmitting frequency controller 13 selects the capacitor C4, which is the wiring W. In a similar way, the power receiving frequency controller 23 sets the capacitance of the power receiving resonant coil 22 to 0. As a result, the power transmitting resonant coil 12 does not resonate, and also the power receiving resonant coil 22 does not resonate. Because of this and a fact that the coil distance is so short that the coil distance is in the area D1, the power transmitting resonant coil 12 may transmit electric power to the power receiving resonant coil 22 by using electromagnetic induction.

When the coil distance is in the area D2, which is the near-field, the power transmitting frequency controller 13 sets the resonant frequency of the power transmitting resonant coil 12 in FIG. 2A to a value determined on the basis of the coil distance. In a similar way, the power receiving frequency controller 23 sets the resonant frequency of the power receiving resonant coil 22 to a value determined on the basis of the coil distance, which is the same value as that of the resonant frequency of the power transmitting resonant coil 12. In this way, the power transmitting resonant coil 12 may transmit electric power as magnetic field energy to the power receiving resonant coil 22 by using magnetic field resonance.

Specifically, when the coil distance is in the area D2, which is one of the near-fields, as described above with reference to FIG. 2A, the power transmitting frequency controller 13 sets the capacitance of the capacitor 122 of the power transmitting resonant coil 12 in FIG. 2A to one of C1 to C3. In this way, the power transmitting frequency controller 13 sets the resonant frequency of the power transmitting resonant coil 12 to a value selected from a plurality of values f1 to f3 set in advance on the basis of the coil distance. In a similar way, the power receiving frequency controller 23 sets the resonant frequency of the power receiving resonant coil 22 to a value selected from a plurality of values f1 to f3 set in advance on the basis of the coil distance, which is the same value as that of the resonant frequency of the power transmitting resonant coil 12.

For example, in the example of FIG. 3, at the coil distance d1, the capacitor 122 having capacitance C3 is selected, and the resonant frequency is set to f3. In the area near the center between d1 and d2, the capacitor 122 having capacitance C2 is selected, and the resonant frequency is set to f2. In the area near the coil distance d2, the capacitor 122 having capacitance C1 is selected, and the resonant frequency is set to f1. Instead of selecting the capacitance of the capacitor 122, the inductances L3 to L1 of the coil unit 121 may be selected.

As illustrated in FIG. 2B, by changing the value of the variable capacitor 123 on the basis of the coil distance, the resonant frequency may be continuously changed.

Here, the same value of the resonant frequency need not necessarily be the exact same value, and may be almost the same value. Whether or not the value is almost the same is determined depending on the Q value. The range in which the value is almost the same decreases as the Q value increases, and the range increases as the Q value decreases. The range in which the value is almost the same is, for example, a frequency range in which the value at the resonance point becomes half-value. Or, the range in which the value is almost the same is a frequency range in which efficiency to be attained is achieved. Or, the range in which the value is almost the same is a frequency range in which electric power may be transmitted with efficiency higher than with transmission by electromagnetic induction.

When the coil distance is in the area D3, which is the other one of the near-fields, the power transmitting frequency controller 13 fixes the resonant frequency of the power transmitting resonant coil 12 in FIG. 2A to the resonant frequency f0 set in advance. Specifically, in the power transmitting resonant coil 12, the capacitor 122 having capacitance C0 is selected, and the resonant frequency is set to f0. In a similar way, the power receiving frequency controller 23 sets the resonant frequency of the power receiving resonant coil 22 to a resonant frequency set in advance, which is the same value as that of the resonant frequency of the power transmitting resonant coil 12. In this way, the power transmitting resonant coil 12 may transmit electric power as magnetic field energy to the power receiving resonant coil 22 by using magnetic field resonance.

As known from the examples of FIGS. 4A and 4B, actually, the power receiving apparatus 2 approaches the power transmitting apparatus 1 from a distance. In other words, the power receiving apparatus 2 approaches the power transmitting apparatus 1 while passing through the areas D3, D2, and D1 in this order.

Therefore, in the power transmitting resonant coil 12 and the power receiving resonant coil 22, the capacitors 122 having capacitances C0, C1, C2, C3, and C4 (=0) are selected in this order. In other words, while the coil distance, which is the distance between the power transmitting resonant coil 12 and the power receiving resonant coil 22, is in the area D3, the capacitor 122 having the capacitance C0 is selected. While the coil distance is in the area D2, the capacitors 122 having the capacitances C1, C2, and C3 are selected. Therefore, in the table of the power transmitting frequency controller 13, the area D2 is further divided into three sub-areas corresponding to the capacitances C1, C2, and C3 on the basis of the coil distance. While the coil distance is in the area D1, the capacitor 122 having the capacitance C4 (=0) is selected. In this way, the resonant frequency of the power transmitting resonant coil 12 and the resonant frequency of the power receiving resonant coil 22 are selected in an order of f0, f1, f2, and f3, and finally no resonance state is selected.

FIGS. 4A and 4B illustrate the wireless power supply apparatus in FIG. 5 is applied to a vehicle.

The vehicle 4 includes a battery to drive the vehicle 4, like, for example an electric vehicle or a so-called hybrid vehicle. The power receiving apparatus 2 is provided in the vehicle 4, and for example, the power transmitting apparatus 1 is provided in a parking lot or an electric power supply station.

For example, as illustrated in FIG. 4A, the power transmitting apparatus 1 and the power transmitting resonant coil 12 are provided on the floor of the parking lot or the like, and the power receiving apparatus 2 and the power receiving resonant coil 22 are provided on the bottom surface of the vehicle 4. Or, as illustrated in FIG. 4B, the power transmitting apparatus 1 and the power transmitting resonant coil 12 are provided on the wall of the parking lot or the like, and the power receiving apparatus 2 and the power receiving resonant coil 22 are provided on the front surface or the rear surface of the vehicle 4.

In this way, when the vehicle 4 is parked in a determined position, as illustrated in FIG. 4A or 4B, the power transmitting resonant coil 12 and the power receiving resonant coil 22 face each other. At this time, the coil distance, which is the distance between the power transmitting resonant coil 12 and the power receiving resonant coil 22, takes various values in accordance with the vehicle type and the position where the vehicle is parked.

Also, when the coil distance changes in this way, the resonant frequency of the power transmitting resonant coil 12 and the power receiving resonant coil 22 is changed in accordance with the coil distance. Because of this, electric power may be efficiently transmitted as magnetic field energy from the power transmitting resonant coil 12 to the power receiving resonant coil 22 by using magnetic field resonance. In addition to this, particularly in FIG. 4B, even when the distance between the power transmitting resonant coil 12 and the power receiving resonant coil 22 becomes extremely small, electric power may be efficiently transmitted by using electromagnetic induction. As a result, the battery of the vehicle 4 may be charged in a short time.

The present invention may be applied in a similar way to, for example, a moving body such as a robot in a factory or home instead of the vehicle 4.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

The invention claimed is:

1. A wireless power supply apparatus, comprising:
a power supply unit configured to supply electric power;
a power transmitting resonant coil configured to be able to resonate in a magnetic field with a power receiving resonant coil at a first resonant frequency that generates a magnetic field resonance, and transmit the electric power supplied from the power supply unit as a magnetic field energy by using the magnetic field resonance;
a power receiving resonant coil configured to be able to resonate in a magnetic field with the power transmitting resonant coil at the first resonant frequency, and receive the magnetic field energy transmitted from the power transmitting resonant coil by using the magnetic field resonance;
a power receiving unit configured to output the magnetic field energy received by the power receiving resonant coil as electric power;
a distance detector configured to detect a distance between the power transmitting resonant coil and the power receiving resonant coil;
a power transmitting frequency controller configured to change the first resonant frequency of the power transmitting resonant coil from the first resonant frequency to a second resonant frequency on the basis of the distance detected by the distance detector, the power transmitting frequency controller being provided for the power transmitting resonant coil; and
a power receiving frequency controller configured to change the first resonant frequency of the power receiving resonant coil from the first resonant frequency to a second resonant frequency on the basis of the distance detected by the distance detector, the power receiving frequency controller being provided for the power receiving resonant coil.

2. The wireless power supply apparatus according to claim 1 comprising a switch that inhibits resonance, wherein the wireless power supply apparatus transmits the electric power between the power supply unit and the power transmitting resonant coil by using electromagnetic induction, and transmits the electric power between the power receiving resonant coil and the power receiving unit by using electromagnetic induction.

3. The wireless power supply apparatus according to claim 1,
wherein, when the electric power is transmitted over the distance between the power transmitting resonant coil and the power receiving resonant coil, and when the distance is in an area in which transmission efficiency increases as the distance increases,
the power transmitting frequency controller sets the second resonant frequency of the power transmitting resonant coil to a value determined on the basis of the distance, and the power receiving frequency controller sets the second resonant frequency of the power receiving resonant coil to a value determined on the basis of the distance, which is the same value as that of the second resonant frequency of the power transmitting resonant coil, and
thereby the wireless power supply apparatus transmits the electric power as a magnetic field energy between the power transmitting resonant coil and the power receiving resonant coil by using the magnetic field resonance.

4. The wireless power supply apparatus according to claim 3,
wherein the power transmitting frequency controller sets the second resonant frequency of the power transmitting resonant coil to a value selected from a plurality of values set in advance on the basis of the distance, and
the power receiving frequency controller sets the second resonant frequency of the power receiving resonant coil to a value selected from a plurality of values set in advance on the basis of the distance, which is the same value as that of the second resonant frequency of the power transmitting resonant coil.

5. The wireless power supply apparatus according to claim 1,
wherein, when the electric power is transmitted over the distance between the power transmitting resonant coil and the power receiving resonant coil, and when the distance is in an area in which transmission efficiency decreases as the distance increases,
the power transmitting frequency controller sets the resonant frequency of the power transmitting resonant coil to the first resonant frequency, and the power receiving frequency controller sets the resonant frequency of the power receiving resonant coil to the first resonant frequency, and thereby the wireless power supply apparatus transmits the electric power as a magnetic field energy between the power transmitting resonant coil and the power receiving resonant coil by using the magnetic field resonance.

6. The wireless power supply apparatus according to claim 1,
wherein, the power transmitting resonant coil includes an inductor and a capacitor,
the power receiving resonant coil includes an inductor and a capacitor, and
when the distance between the power transmitting resonant coil and the power receiving resonant coil is in an area in which the electric power may be transmitted between the power transmitting resonant coil and the power receiving resonant coil by using electromagnetic induction, the power transmitting frequency controller sets a capacitance of the capacitor of the power transmitting resonant coil to 0, and the power receiving frequency controller sets a capacitance of the capacitor of the power receiving resonant coil to 0, and thereby the wireless power supply apparatus transmits the electric power between the power transmitting resonant coil and the power receiving resonant coil by using the electromagnetic induction.

7. A wireless power supply apparatus, comprising:

a power supply unit configured to supply electric power with a first resonant frequency;

a power transmitting coil configured to transmit the electric power by converting the electric power into magnetic field energy;

a power transmitting resonant circuit configured to be able to change a power transmitting resonance characteristic, the power transmitting resonant circuit including the power transmitting coil;

a power transmitting frequency controller configured to change the power transmitting resonance characteristic of the power transmitting resonant circuit;

a power receiving coil configured to receive the magnetic field energy and convert the magnetic field energy into electric power;

a power receiving resonant circuit configured to be able to change a power receiving resonance characteristic, the power receiving resonant circuit including the power receiving coil;

a power receiving frequency controller configured to change the power receiving resonance characteristic of the power receiving resonant circuit; and a detector configured to detect a relative relationship between the power transmitting coil and the power receiving coil, wherein the power transmitting resonance characteristic and the power receiving resonance characteristic have a plurality of resonance characteristics which include a first resonating characteristic that resonates at the first resonant frequency and a second resonating characteristic that resonates at a second resonant frequency different from the first resonant frequency, and the power transmitting frequency controller and the power receiving frequency controller switch the resonance characteristics of the power transmitting resonant circuit and the power receiving resonant circuit between the first resonating characteristic and the second resonating characteristic.

* * * * *